United States Patent [19]
Gagnon

[11] Patent Number: 5,719,554
[45] Date of Patent: Feb. 17, 1998

[54] AUTOMOBILE ERRATIC BEHAVIOR MONITORING APPARATUS

[76] Inventor: Richard B. Gagnon, 4 Via Colorso, San Clemente, Calif. 92672

[21] Appl. No.: 806,533

[22] Filed: Feb. 24, 1997

[51] Int. Cl.⁶ .................................................. B60Q 1/00
[52] U.S. Cl. .................... 340/439; 340/429; 340/440; 73/499; 364/424.034; 364/424.047
[58] Field of Search ............................... 340/439, 440, 340/429, 467, 689, 465, 466, 4; 364/424.034, 424.035, 424.047; 200/61.45 R, 61.52; 73/489, 499, 504.02, 504.03, 510, 512

[56] References Cited

U.S. PATENT DOCUMENTS

| | | | |
|---|---|---|---|
| 1,401,986 | 1/1922 | Kershaw | 340/429 |
| 3,946,359 | 3/1976 | Henderson | 340/439 |
| 4,500,868 | 2/1985 | Tokitsu et al. | 340/439 |
| 4,651,128 | 3/1987 | Kokb | 340/440 |
| 4,908,767 | 3/1990 | Scholl et al. | 364/453 |
| 5,269,187 | 12/1993 | Hanson | 73/499 |
| 5,469,132 | 11/1995 | Lam | 340/429 |
| 5,581,464 | 12/1996 | Woll et al. | 364/424.04 |

*Primary Examiner*—Jeffery Hofsass
*Assistant Examiner*—Davetta Woods
*Attorney, Agent, or Firm*—Edward E. Roberts

[57] ABSTRACT

A driving behavior monitoring system mountable within a vehicle and having a board member on which are mounted first and second accelerometer devices for measuring acceleration in mutually orthogonal directions. Each accelerometer device includes an arm member in the form of a generally L-shaped crank or elbow. The crank is pivotable at the elbow joint thereof, and one arm of the crank is provided with a weight at the end thereof with the other arm having the free end thereof attached to one end of a tension spring, the other end of which is fixedly attached to the board member. A pair of electrical switch contacts are positioned in spaced relation on either side of the spring, with each contact being placed at approximately the same distance from the axial centerline of the spring. Movement of the weight translates to deflection of the spring in a direction orthogonal to its axis. The spring is in circuit relation with a suitable power source and upon deflection of the spring, contact of the spring is made with one of the switch contacts, each of which is connected to its own terminal of electrical circuitry which records the closures. The circuitry includes a keypad, a segmented LED display and a microcontroller which responds to the accelerometer devices for counting the number of each such closure of the individual switches in accordance with the direction of force caused by erratic maneuvers. Provision is made in the circuitry for password access, resetting and detection of removal or disablement of the circuitry.

18 Claims, 3 Drawing Sheets

AUTOMOBILE ERRATIC BEHAVIOR MONITORING APPARATUS

BACKGROUND OF THE INVENTION

The background of the invention will be discussed in two parts.

1. Field of the Invention

This invention relates to vehicle movement sensing devices, and more particularly to an apparatus for mounting within an automobile for detecting and recording the number of incidents of erratic vehicular movements.

2. Description of the Prior Art

Parents have a high degree of concern when the new driver in the family sets off alone with the family automobile. In many instances, notwithstanding the parent's admonitions, a young driver may not always engage in proper driving habits. New drivers oftentimes have a propensity to test their driving skills with unnecessary maneuvers, such as unduly rapid acceleration, or other rapid left-hand and right-hand turns. Usually these maneuvers are performed out of sight of the parents.

Parents would like the ability to monitor the young driver, but ordinarily have no way of ascertaining the young driver's solo driving demeanor, absent an eye witness who is willing to report the erratic driving behavior.

In accordance with an aspect of the invention, there is provided a device, mountable within the vehicle, for detecting and recording the number of incidents of such erratic driving by recording occurrences of rapid acceleration (or deceleration) as well as hard left and right turns.

SUMMARY OF THE INVENTION

The foregoing and other objects of the invention are accomplished by providing an apparatus mountable within the vehicle and having a board member on which are mounted first and second accelerometer devices for measuring acceleration in mutually orthogonal directions.

Each accelerometer device includes an arm member in the form of a generally L-shaped crank or elbow. The crank is pivotable at the elbow joint thereof, and one arm of the crank is provided with a weight at the end thereof with the other arm having the free end thereof attached to one end of a tension spring, the other end of which is fixedly attached to the board member.

A pair of electrical switch contacts are positioned in spaced relation on either side of the spring, with each contact being placed at approximately the same distance from the axial centerline of the spring. Movement of the weight translates to deflection of the spring in a direction orthogonal to its axis.

The spring is in circuit relation with a suitable power source and upon deflation of the spring, contact of the spring is made with one of the switch contacts, each of which is connected to its own terminal of electrical circuitry which records the closures. The circuitry includes a keypad, a segmented LED display and a microcontroller which responds to the terminal of electrical circuitry which records the closures. The circuitry includes a keypad, a segmented LED display and a microcontroller which responds to the accelerometer devices for counting the number of each such closure of the individual switches in accordance with the direction of force caused by erratic maneuvers. Provision is made in the circuitry for password access, resetting and detection of removal or disablement of the circuitry.

Other objects, features and advantages of the invention will become apparent from a reading of the specifications, when taken in conjunction with the drawings, in which like reference numerals refer to like elements in the several views.

DESCRIPTION OF THE PREFERRED EMBODIMENT

Figure 1:
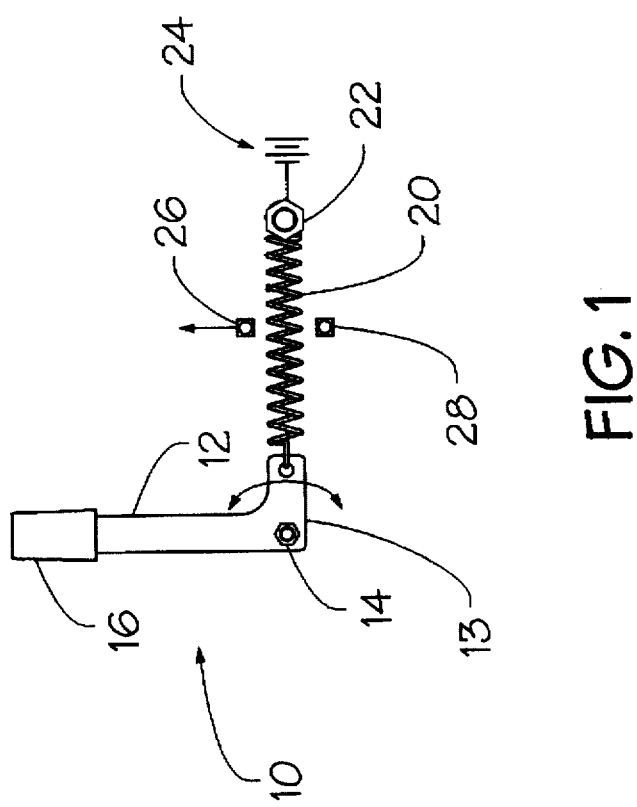
FIG. 1 is a simplified diagrammatic view of an accelerometer device used in the present invention.

Referring now to the drawings and particularly to FIG. 1, for ease of explanation, there is shown a diagrammatic view of one of the accelerometer devices utilized in the erratic driving monitoring apparatus of the invention. The device includes a crank, generally designated 10, which is a right angularly shaped member having mutually perpendicular arms 12, 13, with the crank 10 being pivotable about the midpoint at the elbow 14. A weight 16 is attached to the free end of the arm 12, while one end of an electrically conductive spring 20 is attached to the free end of the other arm 13.

The other end of the spring 20 is anchored or suitably secured to a metal stud 22. A suitable power source, such as a battery 24 is provided in circuit path relation with the spring 20 via stud 22.

First and second electrical contacts 26 and 28 are positioned on opposite sides of the axial centerline of the spring 20 (shown in its neutral position), each of the contacts 26, 28 being a fixed preset distance from the spring centerline. Upon pivoting of the crank 10, in response to left or right forces (directionally as viewed in the drawing), the spring will deflect upwardly or downwardly.

By way of example, rapid left movement will cause the crank 10 to pivot clockwise, thus deflecting the spring 20 downwards into contact with the lower contact 28, which collectively form a switch and will complete a circuit from the battery 22 through the spring 20 through contact 28 to the external circuitry which will be described hereinafter. Likewise opposite rapid movement will close the switch consisting of the spring 20 and the upper contact 26.

In the preferred embodiment, the weight of the weight 16, the dimensions of the crank 10, that is, the length of the arms 12, 13 and the force of the spring 20, along with the spacing of the contacts 26, 28 are selected to provide switch closure only when the "g" force exceeds a predetermined threshold which is indicative of erratic movement in the monitoring directions.

As will be described, one of such devices is positioned to monitor sidewise forces, that is left and right cornering, while a second similar device is, or similar devices are, positioned to monitor forward and reverse movements of the vehicle.

Figure 2:
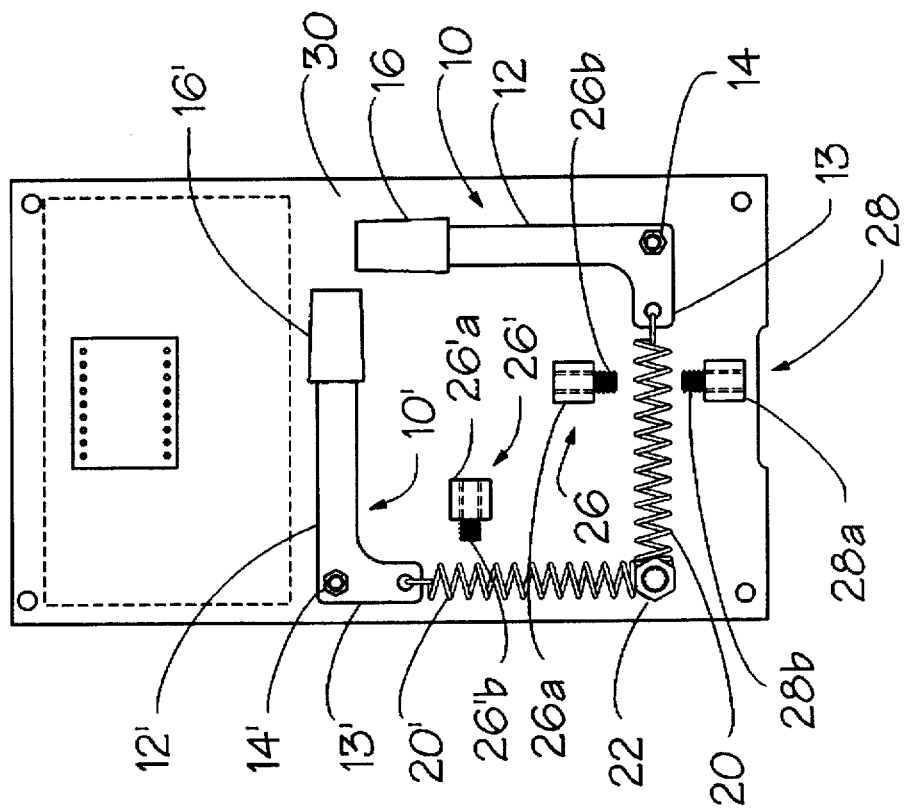
FIG. 2 is a top plan view of the circuit board with first and second accelerometer devices mounted thereon.
Figure 3:
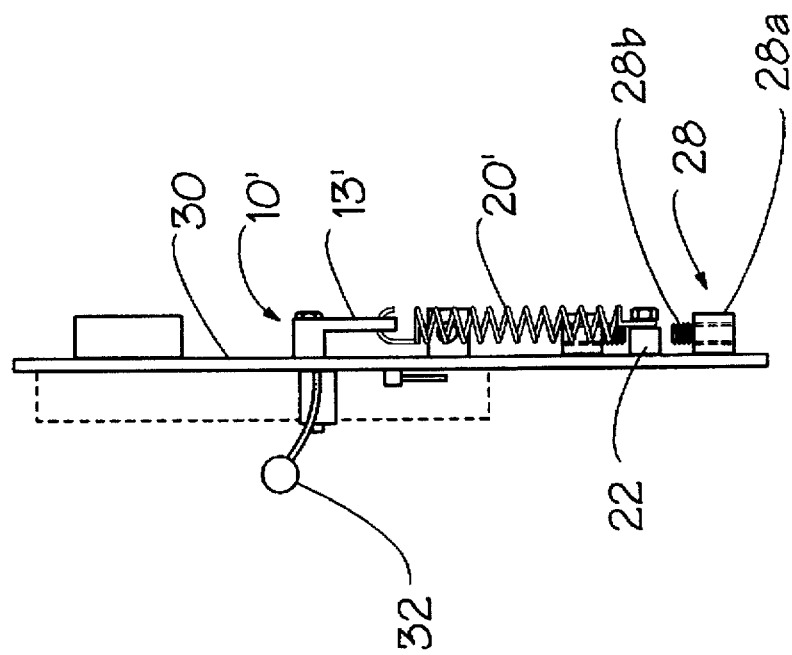
FIG. 3 is a side view of the circuit board as shown in FIG. 2.

As shown in FIGS. 2 and 3, the mounting surface of the accelerometer devices is a portion of the surface of a rectangular printed circuit board 30. As depicted in FIG. 2, the board 30 is a plan view, that is, it will be mounted within the vehicle so that the plane of the board 30 is generally parallel to the ground on which the vehicle rests. The long axis of the board 30 is aligned with the direction of travel of the vehicle, with the front edge of the board being positioned toward the front of the vehicle.

Figure 5:
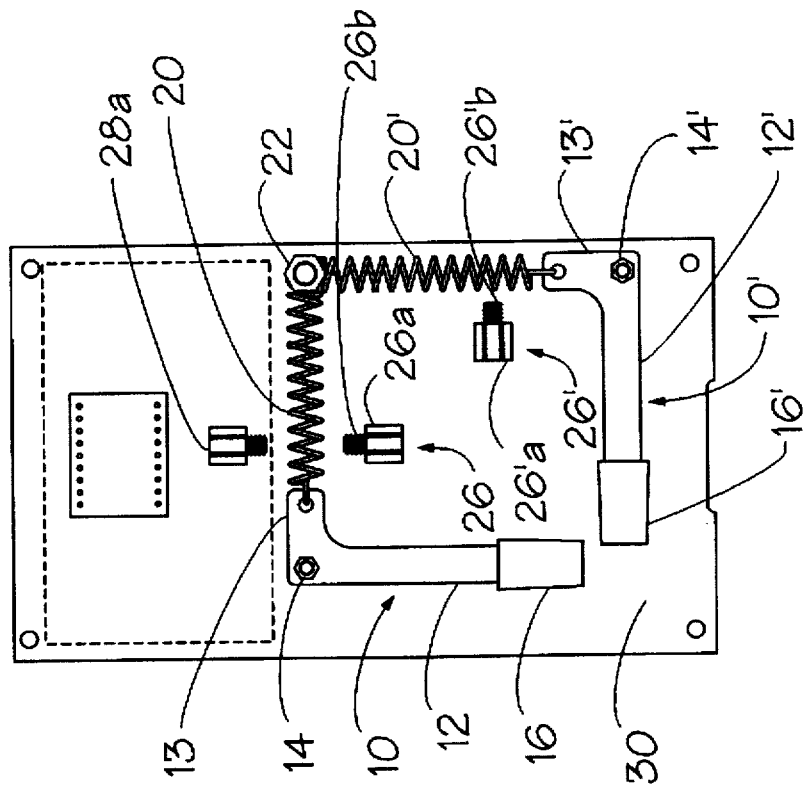
FIG. 5 is a top plan view of a circuit board having a different orientation of accelerometers from that of FIG. 2.

In the embodiment illustrated in FIG. 2, one of the accelerometer devices is oriented for monitoring forward movement braking or reverse movement acceleration, with the other device oriented for monitoring cornering movement. Similarly, one other accelerometer device (FIG. 5) is oriented to monitor forward movement acceleration or reverse movement braking, with the other device oriented for monitoring cornering movement. As shown, the devices for monitoring either forward or reverse movement is provided with only one contact. It is to be understood that other orientations, or combination of orientations, accelerometers, and electronincs may be devised without departing from the scope of the invention.

Specifically, a first crank 10 of a first accelerometer device is pivotably attached at 14 adjacent the lower right corner of the board 30, with the arm 13 connected to one end of spring 20, the other end of which is attached to the stud 22 (which serves as the electrical connection to the power source 24), so that the axial centerline of spring 20 is generally parallel and adjacent the lower edge of the board 30. This positions the arm 12 with its attached weight 16 generally parallel to the right side of the board 30.

First and second switch contacts 26, 28 are mounted in general alignment with the longitudinal centerline of the board 30 and positioned on opposite sides of the spring 20 so that the spacing from the spring 20 centerline is approximately equal for each contact 26, 28.

The contacts 26, 28, in the preferred embodiment, are formed of two parts, a chassis fastener 26a, 28a and set screws 26b, 28b. By reference to one assembly, the chassis fastener 28a is a box-like conductive member with a threaded bore for receiving the set screw 28b. The chassis connector is secured to the board 30 with the set screw 28b in general parallel relation to the plane of the board, and in alignment with the set screw 26b of the opposite switch contact 26. With this construction, adjustment may be made to the sensitivity of the device by suitable tightening or loosening of the set screws.

The second accelerometer device has the corresponding parts thereof bearing the same reference numerals as the first, followed by a prime ('). For ease of manufacture and assembly, all components are generally identical to that of the first accelerometer in the sense of dimensions, weight, spring force, etc. The crank 10' is pivotably mounted to the board 30 at the elbow 14', with the long arm 12' positioned generally perpendicular to the long arm 12 of the first accelerometer device.

Correspondingly the spring 20' is parallel to the arm 12. In other respects the mounting is similar. The main difference, other than orientation, is that the second accelerometer is provided with only one switch contact 26', positioned relative to the spring 20' with the same dimensions and spacing as the first accelerometer. This contact 26' is likewise adjustable as previously described.

As a point of reference, and as previously mentioned, accelerometer device 10' is oriented for monitoring forward movement braking or reverse movement acceleration, with the other accelerometer device 10 oriented for monitoring cornering movement. The board 30 position in the drawings is oriented so that the forward direction of the vehicle will be downwards. Thus, on rapid forward movement braking, or reverse movement acceleration, the weight 16' of the second accelerometer device 10' will be urged to pivot the crank arm 12' counterclockwise and urging the spring 20' to the right into contact with the switch contact 26'. Accordingly, with the first and second accelerometer devices mounted on board 30, as shown and described, excessive "g" forces due to rapid movement of the vehicle will result in switch closure which is detected and recorded as will be described.

Figure 4:
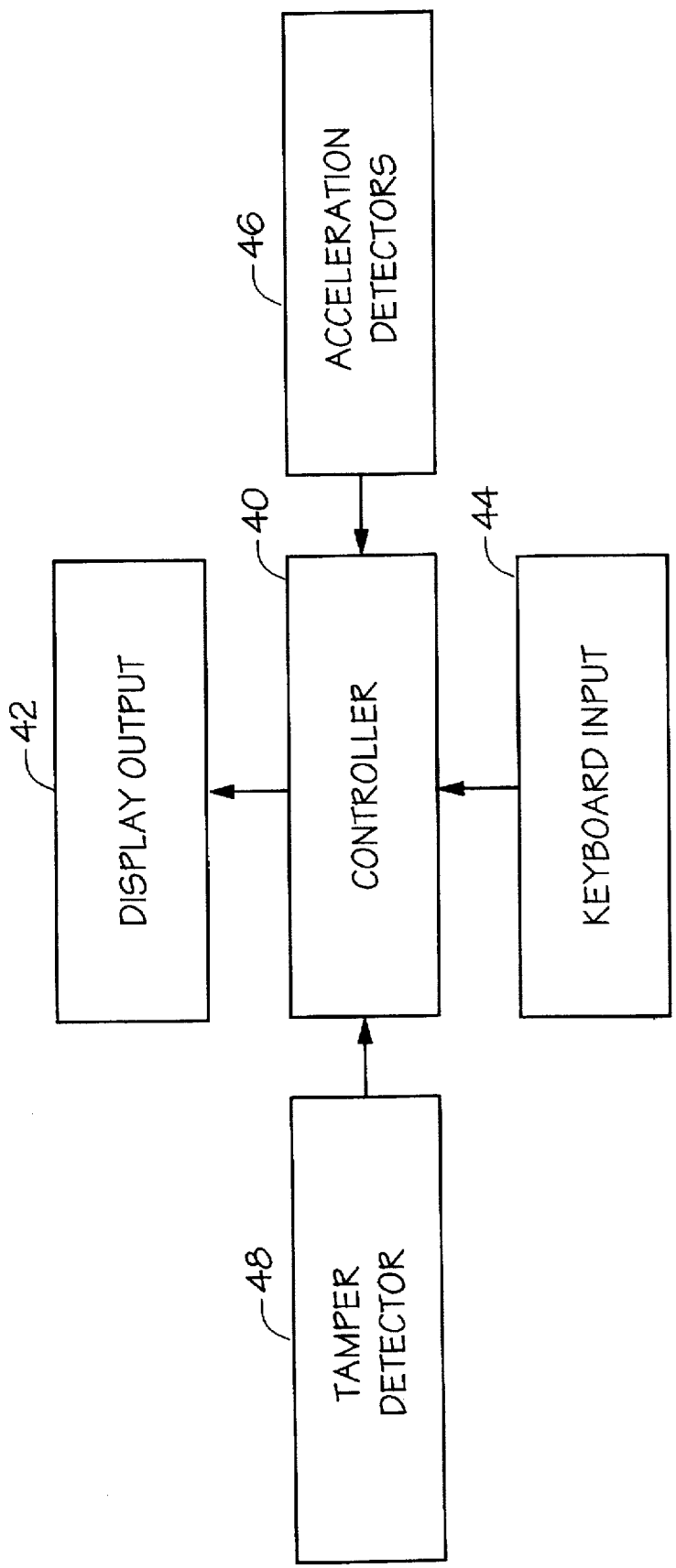
FIG. 4 is a general functional block diagram of the circuitry utilized in the invention.

FIG. 4 is a functional block diagram for reference purposes to depict the various functions of the circuitry of the monitor apparatus. At the center is the controller 40 which includes microcontroller electronics, password switches, power tamper bit and battery power. The controller interfaces with the other functional blocks 42 (display output), 44 (keyboard input), 46 (acceleration detectors), and 48 (tamper detector).

The display block 42 receives inputs from the controller 40 and is a two digit segmented LED display for displaying mode status, violation counts and tamper status. The keyboard block 44 includes a multi-function membrane switch array and inputs to the controller 40 mode signals, while also permitting entry of password data, clearing violation and tamper data. The acceleration detector block 46 includes the first and second accelerometers previously described, while the tamper detector block 48 senses physical tampering with the apparatus and includes a magnetic reed switch, such as switch 32 mounted on the undersurface of the board 30, as shown in FIG. 3.

Password entry is accomplished via the keyboard with the password setting effected via an 8-p dip switch (not shown) which is used to set the password, in accordance with the following table:

| PASSWORD SWITCH SETTING TABLE | | | | | | | | |
|---|---|---|---|---|---|---|---|---|
| FIRST DIGIT | 1 | 2 | 3 | 4 | 5 | 6 | 7 | 9 |
| Switch 1 | C | O | C | O | C | O | C | O |
| Switch 2 | C | C | O | O | C | C | O | O |
| SECOND DIGIT | 1 | 2 | 3 | 4 | 5 | 6 | 7 | 9 |
| Switch 3 | C | O | C | O | C | O | C | O |
| Switch 4 | C | C | O | O | C | C | O | O |
| THIRD DIGIT | 1 | 2 | 3 | 4 | 5 | 6 | 7 | 9 |
| Switch 5 | C | O | C | O | C | O | C | O |
| Switch 6 | C | C | O | O | C | C | O | O |
| FOURTH DIGIT | 1 | 2 | 3 | 4 | 5 | 6 | 7 | 9 |
| Switch 7 | C | O | C | O | C | O | C | O |
| Switch 8 | C | C | O | O | C | C | O | O |

The switch output is provided to a 1 m×9 memory and simultaneously to a decoder, the output of which is coupled to the microcontroller. The output of the microcontroller is coupled to a second decoder, which is coupled to the display. A second array of switches each provide a signal in series to an input of an 8-bit to 3-bit third encoder, the output of which is coupled to the controller. Each of the integrated circuits includes the manufacturer's designation for reference to readily available specifications and data sheets.

The aforesaid second set of switches have a first four switches of the switch array which have the respective marked functions of Clear, Next and Mode. These four switches are on the membrane keypad, with the four switches of the pad serving a dual function for the four digit password entry. After the word "Clear" there is shown "4/8"; on the second switch "3/7"; after "Next" there is shown "2/6" and after "Mode" there is shown "1/5". This is an abbreviation to indicate that the "Clear" switch serves three functions, that is, the entry of "Clear" as well as the entry of the numeral 4 or 8. Although this appears to be three functions, by reference to the above switch setting table the code for numeral 4 is the same as numeral 8. The same dual function applies to next 1/6, etc.

The last four switches are designated "Reed or Plunger", "Top E3", "Middle E2" and "Bottom E1" and are respectively, the switches on the board 30 for detecting for tamper (i.e., the reed switch), erratic accelerations (top switch contact 26' as viewed in FIG. 2), rapid left turns (middle switch contact 26 in FIG. 2) and rapid right turns (bottom switch 28 in FIG. 2).

In operation, closure of the accelerometer switches and the reed switch on board 30 will be transmitted through the respective switches to the controller 40 via the 8:3 encoder, whereupon the counts will be counted and stored in the controller.

Although not shown, it is to be understood that the above components are packaged and housed in a box-like enclosure which is mountable within a vehicle in any convenient location, such as the trunk, the engine compartment, or even the glove compartment. Of course the unit must be mounted with proper orientation as described with reference to the circuit board of FIG. 2.

In operation, the user sets up a password of four digits by activating the switches of the aforesaid 8-p dip switch in accordance with the above password switch setting table. Thereafter, after use of the vehicle, the parent may enter the password to check the status of the apparatus. The apparatus is normally in monitor mode. The user then depresses the "Mode" switch (a membrane keypad) whereupon the display 42 then briefly displays "11", which is the password entry mode. The four digit password is then entered via the keypad.

If an incorrect entry is made, a 3 second delay is required prior to a second attempt. A legal password entry places the system in the "view-counters" mode which enables the user to sequentially view the counts of erratic acceleration, left turns and right turns. In the view counters mode, a 1 is displayed indicating that the next display is the "contact 1" display (erratic accelerations). By depressing the "Next" switch, the counts for contact 1 will be displayed. Depressing the "Next" switch will then provide a display alternating between "contact 2" and the number of counts (erratic left turns).

Likewise depressing the "Next" switch will then provide a display alternating between "contact 3" and the number of counts (erratic right turns). This process may be repeated by continuing to depress the "Next" switch.

To clear the counters, the "Mode" switch is depressed to advance the system to the "clear-counters" mode, whereupon a "0" is displayed. To continue without clearing the counters, the Mode switch is depressed; alternatively to clear the counters, the "Clear" switch is depressed. After clearing the display will show "00", indicating that the counters have been cleared and the system will then return to monitor mode. If there is no switch depression for more than 25 seconds, the display will clear and the system will return to monitor mode.

While there has been shown and described a preferred embodiment, it is to be understood that various other adaptations and modifications may be made within the spirit and scope of the present invention.

I claim:

1. A system for monitoring vehicular movement comprising:
    a board member adapted for placement in a vehicle;
    first and second accelerometer devices mounted on said board member for measuring acceleration forces in mutually orthogonal directions, each of said accelerometer devices including
        a generally L-shaped crank pivotably mounted to said board at the elbow joint thereof, one arm of the crank being provided with a weight at the end thereof;
        a tension spring attached to said board member and to the free end of the other arm of said crank;
        at least one electrical switch contact positioned on said board member in spaced relation to one side of said spring, movement of the weight in response to acceleration force deflecting said spring in a direction orthogonal to its axis toward said switch contact; and
        electronic means in circuit relation with each of said switch contacts for recording the number of closures of each spring with its associated switch contact.

2. The system of claim 1 wherein said electronic means includes a microcontroller having a keypad for providing access to the circuitry only in response to a preset password.

3. The system of claim 2 wherein said electronic means further includes a display for providing a visual indication of the recorded counts.

4. The system of claim 1 wherein one of said accelerometer devices is configured for switch closure in response to acceleration forces caused by rapid forward movement of the vehicle.

5. The system of claim 4 wherein the other of said accelerometer devices includes a second electrical switch contact positioned on said board member in spaced relation to the other side of said spring, the two switch contacts being positioned in spaced relation on either side of the spring, with each contact being placed at approximately the same distance from the axial centerline of the spring, said other accelerometer device being configured for switch closure in response to acceleration forces caused by rapid right and left hand turns of the vehicle.

6. The system of claim 1 wherein each of said switch contacts includes means for adjusting the distance between said contact and said spring for enabling setting of the acceleration force required for switch closure.

7. The system of claim 5 wherein said electronic means includes a microcontroller having a keypad for providing access to the circuitry only in response to a preset password and a display for providing a visual indication of the recorded counts.

8. The system of claim 7 wherein said electronic means includes means for detecting and recording of tampering with said system.

9. The system of claim 1 wherein one of said accelerometer devices is configured and oriented for switch closure in response to acceleration forces caused by rapid forward movement braking or reverse movement acceleration of the vehicle.

10. The system of claim 9 wherein the said other of said accelerometer devices includes a second electrical switch contact positioned on said board member in spaced relation to the other side of said spring, the two switch contacts being positioned in spaced relation on either side of the spring, said other accelerometer device being configured for switch closure in response to acceleration forces caused by rapid right and left hand turns of the vehicle.

11. The system of claim 1 wherein one of said accelerometer devices is configured and oriented for switch closure in response to acceleration forces caused by rapid forward movement acceleration or reverse movement braking.

12. The system of claim 11 wherein the said other of said accelerometer devices includes a second electrical switch contact, the two switch contacts being positioned in spaced relation on either side of the spring, said other accelerometer device being configured for switch closure in response to acceleration forces caused by rapid right and left hand turns of the vehicle.

13. A system for monitoring vehicular movement comprising:

a board member adapted for placement in a vehicle;

accelerometer devices mounted on said board member for measuring acceleration forces in mutually orthogonal directions, each of said accelerometer devices including a generally L-shaped crank pivotably mounted to said board at the elbow joint thereof, one arm of the crank being provided with a weight at the end thereof;

a tension spring attached to said board member and to the free end of the other arm of said crank;

at least one electrical switch contact positioned on said board member in spaced relation to one side of said tension spring, movement of the weight in response to acceleration force deflecting said spring in a direction orthogonal to its axis toward said switch contact; and electronic means in circuit relation with each of said switch contacts for recording the number of closures of each spring with its associated switch contact.

14. The system of claim 1 wherein one of said accelerometer devices is configured and oriented for switch closure in response to acceleration forces caused by rapid forward movement braking or reverse movement acceleration of the vehicle, one of said accelerometer devices is configured and oriented for switch closure in response to acceleration forces caused by rapid forward movement acceleration or reverse movement braking, and one of said accelerometer devices being configured for switch closure in response to acceleration forces caused by rapid right and left hand turns of the vehicle.

15. The system of claim 14 wherein said electronic means includes a microcontroller having a keypad for providing access to the circuitry only in response to a preset password.

16. The system of claim 14 wherein said electronic means further includes a display for providing a visual indication of the recorded counts.

17. The system of claim 14 wherein said electronic means includes means for detecting and recording of tampering with said system.

18. The system of claim 14 wherein said electronic means further includes means for password access, resetting of said electronic means, and detection of removal or disablement of the circuitry of said electronic means.

* * * * *